United States Patent Office 2,892,754
Patented June 30, 1959

2,892,754
PROCESS OF PREPARING VITAMIN
$B_{12}$-INTRINSIC FACTOR

Jan Lens, Nimeguen, and Harry Gerard Wijmenga, Oss, Netherlands, assignors to Organon Inc., Orange, N.J., a corporation of New Jersey No Drawing. Application August 21, 1953
Serial No. 375,821

Claims priority, application Netherlands
December 20, 1951

8 Claims. (Cl. 167—74).

This invention relates to biologically active preparations, more particularly to a preparation containing vitamin $B_{12}$ for the treatment of pernicious anemia. This application is a continuation-in-part of our prior copending application Serial No. 326,348, filed December 16, 1952, now abandoned.

Vitamin $B_{12}$ is a recognized agent for preventing pernicious anemia and for treating humans suffering therefrom. Most patients with pernicious anemia ingest, and also excrete, enough vitamin $B_{12}$ each day to prevent or correct their anemia. Unfortunately, such humans cannot absorb through the alimentary system the $B_{12}$ present in their diets and their systems are in many cases unable to protect the vitamin from consumption by bacteria until absorption takes place.

This invention provides a preparation in which vitamin $B_{12}$ is administered orally in such a form that the vitamin is protected against absorption by bacteria and will be absorbed through the gastro-intestinal tract. The preparations of this invention may also be utilized in treating sprue, nutritional macrocytic anemia, macrocytic anemia of infancy and other conditions responsive to vitamin $B_{12}$.

One of the constituents of this invention in a free state has binding power for vitamin $B_{12}$. Said binding factor or constituent is prepared from pylorus, duodenum, stomach, the mucosa of said organs and like animal organs.

A biologically active substance is prepared from the aforementioned organs which is capable of forming, in chemical combination with vitamin $B_{12}$, a compound in which form the vitamin can no longer be utilized as a growth factor for certain bacteria, such as *Lactobacillus lactic Dorner* and *Lactobacillus Leichmannii*. In J. Am. Chem. Soc., 71, 3858 (1949), J. L. Ternberg and R. E. Eakin describe a biologically active factor which has corresponding properties.

The process according to the present invention has for its purpose to produce a preparation which contains vitamin $B_{12}$ in bound form, i.e., in a form which renders it unsuitable as a growth factor for the above mentioned bacteria. In the course of this process, new intermediate vitamin $B_{12}$ preparations are obtained which, when administered orally to patients with pernicious anemia, are surprisingly effective in such small daily doses as 2 mg. and even less.

Furthermore, the process according to the present invention produces a heretofore unknown class of metal containing proteins, namely of cobalt containing proteins. The vitamin $B_{12}$-protein complex obtained by said process is such a new cobalt containing protein.

It was found that preparations according to the present invention can readily be produced by preparing a solution of vitamin $B_{12}$ in an aqueous preparation obtained from animal organs and especially from hog stomach, pylorus, duodenum, the mucosa of said organs, and aqueous extracts thereof, and pouring said reaction mixture into an organic liquid which is miscible with water, which neither detrimentally affects vitamin $B_{12}$ nor the binding factor, and which is capable of precipitating said binding factor from its aqueous solution. Care must be taken that, on pouring the reaction mixture into said organic liquid, the temperature does not substantially exceed 0° C.

The resulting precipitate may be furthermore subjected to a treatment with a mixture of the organic liquid employed for precipitation, and ether preferably in a proportion of 1:1 volume per volume and thereafter with water-free ether alone. After removing the ether by evaporation a dry, pulverulent product is obtained which contains most of the binding factor or constituent present in the starting material. To avoid irreversible cleavage of the resulting vitamin $B_{12}$-binding factor complex, the temperature during its production should not substantially exceed 0° C.

Suitable organic liquids used in the process of this invention are, for instance, the lower alkanols, such as methanol, ethanol, the lower alkanones, such as dimethyl ketone, diethyl ketone or mixtures of these liquids. Excellent results are obtained when using alkanols.

Preferably, an excess of these liquids, for instance, a tenfold excess is employed to insure complete precipitation. Experiments have shown that highly favorable yields are obtained by maintaining a temperature of −20° C. during the process. At a higher temperature it may happen that some of the binding factor remains unreacted and dissolved in the filtrate.

This precipitation method is also eminently suitable for separating the binding factor or constituent from accompanying impurities. For that purpose the solution containing said constituent which is to be purified is mixed with said liquid, such as ethanol or acetone, at an initial temperature of about 0° C.

By increasing the concentration of ethanol, resp. acetone, combined with lowering of temperature, dependent on the nature and quantity of the accompanying impurities, it is possible to remove the impurities since they are precipitated at a lower alcohol and the like concentration than said constituent. In the above-mentioned operations care must, of course, be taken to maintain a pH range within which said constituent is stable. Preferably a pH ranging from about 3 to about 9 has proved of advantage.

For a comparison of the activity of the original solutions with that of the products obtained according to the present invention a provisional unit for said constituent is introduced and used hereinafter. This unit (U) is the quantity of weight (mg.) that is just capable of binding one γ of vitamin $B_{12}$.

The following examples illustrate the invention without, however, limiting the same thereto.

*Example 1*

120 ml. of an aqueous solution prepared from hog stomach and containing 168 U of the active constituent are poured into ten times its volume of 96% ethanol of a temperature of −20° C. A precipitate is formed which, after centrifuging in the centrifuge tube at room temperature, is successively treated with an alcohol-ether mixture (1:1) and with water-free ether, whereafter the product is dried in a vacuum desiccator over concentrated sulfuric acid. 3.405 g. of a powder are obtained. Said powder contains 153 U of the active constituent. The combined filtrates, amounting to 1,130 ml., contain apparently only 9.1 U of said active constituent.

*Example 2*

Equal amounts of solutions containing the active constituent are subjected to a precipitation and processed to pulverulent preparations by different methods. The first solution is subjected to lyophilizing. 1.91 g. of dry substance of an activity of 360 U are obtained.

Three other solutions are poured into ten times its volume of ethanol (96%), the one at —5°, the other at —10°, and the third at —20° C., respectively.

The resulting precipitates are centrifuged at room temperature, washed with 50 ml. of an ethanol-ether mixture (1:1) and subsequently with 50 ml. of water-free ether. After drying, the first solution yields 1.58 g., the second one 1.62 g., and the third one 1.68 g. containing 312, 315, and 329 U, respectively.

*Example 3*

200 ml. of an aqueous solution prepared from hog stomach mucosa and containing 400 U of the active constituent are poured into 12 times its volume of propanol of a temperature of —20° C. while stirring. Thereby a precipitate is formed. The mixture is allowed to stand for 15 min. at —20° c. and the precipitate is centrifuged and reacted with a propanol-ether mixture (1:2), and thereafter with water-free ether. On drying 2.46 g. of a pulverulent material of a total activity of 374 U are obtained.

*Example 4*

120 ml. of a solution prepared from hog duodenum and containing 168 U of the active constituent are poured into ten times its volume of acetone of a temperature of —20° C. The resulting precipitate, after centrifuging, is successively treated with a mixture of acetone and ether (1:1) and with water-free ether, after which it is dried. 4.167 g. of a pulverulent product containing 161 U of the active constituent are obtained. The combined liquids, amounting to 1,112 ml., contain only 2.4 U.

*Example 5*

100 ml. of a crude, aqueous concentrate containing 260 U of the active constituent are poured into 15 times its volume of methyl ethyl ketone of a temperature of —20° C. while stirring vigorously. The mixture is allowed to stand for one hour at said temperature, while stirring. A precipitate is formed which is centrifuged and washed with a mixture of methyl ethyl ketone and ether (1:1) and subsequently with water-free ether. After drying in a vacuum at room temperature, 5.13 g. of a pulverulent substance are obtained, the total activity of which, determined microbiologically, amounts to 265 U.

*Example 6*

To 1.32 l. of an aqueous concentrate prepared from hog pylorus and containing 14,100 U (assayed microbiologically) there are added 14.1 mg. of vitamin $B_{12}$ and the solution is poured, while stirring vigorously, into 4 l. of 96% alcohol cooled to —5° C. by efficient cooling with a mixture of ice and salt, while stirring continuously, care is taken that the temperature does not rise above 0° C. As soon as the entire solution has been added, stirring is continued for another hour. Thereafter the mixture is allowed to stand for 3 hours at 0° C. 3.3 l. of supernatant liquid are siphoned off and an equal volume of ether is added to the remaining residue, which is kept at 0° C. After stirring, the mixture is allowed to stand for 1 hour, whereafter the mixture is filtered through a Buchner funnel. The precipitate is suspended in water-free ether and is again filtered after stirring for several hours. The precipitate is dried in a vacuum desiccator. The yield amounts to 34.5 g. of a powder containing 15,300 U (assayed microbiologically) of the active constituent, which means that 2.25 mg. of this product show an activity of 1 U. The apparent increase in the total number of units in comparison with the starting product is of no significance.

The resulting powder was assayed clinically on 3 relapsed patients suffering from pernicious anemia. 23 mg./daily of said powder were administered orally in the form of tablets. The average increase in the number of erythrocytes amounted to 1.01 millions/mm.³ after 14 days and to 1.41 millions/mm.³ after three weeks. The reticulocyte maximum amounted to 7.7% (8th day), 9.3% (7th day) and 9.1% (8th day), respectively.

A daily dose of 34.5 mg. of the product gave in one patient a very fair increase in the number of erythrocytes, i.e., after 14 days 1.30 millions/mm.³ and after 20 days 2.12 millions/mm.³. The maximum of reticulocytes occurred on the 4th day and amounted to 21.7%.

*Example 7*

To 9.68 l. of an aqueous solution of the active constituent prepared from duodenum mucosa containing 103,500 U (assayed microbiologically), there are added 103.5 mg. of vitamin $B_{12}$. The solution is poured into ten times its volume of 96% alcohol at a temperature below —12° C., while stirring vigorously. The resulting mixture is centrifuged, whereafter the precipitate is washed and taken up in 20 l. of water-free ether. After stirring and standing for 24 hours, the mixture is centrifuged. The precipitate is dried. The yield amounts to 269 g. of a powder, which contains 365 U/g. 2.74 mg. of said powder correspond to 1 U. The powder contains altogether 98,200 U.

It was administered orally to 4 patients suffering from pernicious anemia in a daily dose of 24.44 mg. The average increase in the number of erythrocytes amounted to 0.92 million/mm.³ after 14 days and to 1.39 millions/mm.³ after three weeks.

On administration of a daily dose of 36.66 mg. to 2 patients, the average increase amounted to 1.13 millions/mm.³ after 14 days and to 1.87 millions/mm.³ after three weeks.

*Example 8*

230 ml. of a mixture of a highly purified aqueous concentrate prepared from hog pylorus mucosa of the combination of the active constituent and vitamin $B_{12}$ containing 2,240 U and 2.24 mg. of vitamin $B_{12}$ added, are poured slowly into three times its volume of 96% alcohol cooled to —5° C., while stirring vigorously and keeping the temperature below 0° C. The mixture is stirred for another 3 hours. The resulting precipitate is processed in the same way as described in the preceding example. The yield amounts to 959 mg. The preparation contains altogether 2.033 γ of bound vitamin $B_{12}$, which means that 0.472 mg. of said preparation correspond to 1 U.

This preparation was tested in a daily dose of 4.72 mg. on 4 patients suffering from pernicious anemia. The average increase in the number of erythrocytes amounted to 0.90 million/mm.³ after 14 days and to 1.34 millions/mm.³ after three weeks.

*Example 9*

101 g. of a preparation obtained, for instance, according to the process of example 8 and containing about 127 mg. of total vitamin $B_{12}$ and about 123 mg. of bound vitamin $B_{12}$, were introduced into 2 liters of physiological sodium chloride solution of about 0.9% NaCl at about 0° C. The mixture was stirred at about 3° C. for about 16 hours. The resulting suspension is centrifuged by means of a Sharpless centrifuge, thereby separating undissolved matter from the solution. Said undissolved matter is again suspended in about 500 cc. of physiological sodium chloride solution at 3° C. and centrifuged. The combined salt solutions are then diluted by the addition of 96% ethanol to an alcohol concentration of about 43.7%. Care is taken that during the addition of ethanol the temperature of the mixture does not substantially increase above about 3° C. Preferably, it is kept as low as —5° C. The resulting "precipitate A" is separated from the liquid by centrifuging in a cooled centrifuge, preferably at a temperature of about —5° C. and is washed several times with 43.7% ethanol cooled to —5° C. Further amounts of ethanol cooled to about —5° C. are then added to the filtrate until an alcohol concentration of about 56% is attained. The resulting precipitate is separated by centrifuging in a centrifuge cooled to about —5° C. This "precipitate B" is washed several times with 56% ethanol cooled to about —5° C. It is dissolved in ice water, centrifuged at said low temperature, and subjected to vacuum freeze drying. The total yield of said "precipitate B" precipitated by alkanol of an alcohol concentration between 43.7% and 56.0% is 20.5 g. Of the originally present total vitamin $B_{12}$, about 77.0 mg. are recovered in said "precipitate B" and of the bound vitamin $B_{12}$, about 74.2 mg. This precipitate has a red color and is very effective in the treatment of pernicious anemia. A daily dose of about 7.24 $\mu$g. of bound vitamin $B_{12}$, corresponding to about 2 mg. of said "precipitate B" produced an excellent response in patients suffering from pernicious anemia. This fraction will be called hereinafter "alcohol fraction B" in order to distinguish it from other fractions. It is understood that the alcohol concentrations given in this example are the preferred concentrations. In general, concentrations between about 40% and about 60% are suitable for precipitating a very concentrated fraction. To determine the most suitable alcohol concentration, one may gradually add alcohol to the solution of the starting material in physiological salt solution and may then determine the concentration at which red coloration of the precipitate occurs. This can readily be done by taking samples each time a new amount of alcohol is added, and observing the color of the precipitate. The color of "precipitate A" obtained at an alcohol concentration up to about 40% is usually orange, while "alcohol fraction B," which has activity, is of red color and is the desired fraction. Increasing the alcohol concentration with a sample above about 60% yields a white "precipitate C" which might at times be of slightly pink color, depending upon the starting material used. Proceeding in this manner allows selection of the most suitable fraction having the highest vitamin $B_{12}$ content. It is evident that the above described alcohol fractionation increases the vitamin $B_{12}$ content of "alcohol fraction B" about 300%.

It may be mentioned that a certain amount of vitamin $B_{12}$, originally present in the starting material, remains in "precipitate A" obtained at an alcohol concentration up to 43.7% and may be recovered.

It was found that the vitamin $B_{12}$ content of "alcohol fraction B" can be further increased by fractionating with ammonium sulfate. For this purpose, 20 g. of said "alcohol fraction B" was stirred with 1900 cc. of water at about 3° C. for about 16 hours. The pH of the mixture is between 6.5 and 7.0. The mixture was centrifuged and the remaining small amount of residue was discarded. The filtrate was cooled to 0° C. and 868 g. of ammonium sulfate were added at said temperature. The solution became slightly turbid. Further addition of 124 g. of ammonium sulfate increased the ammonium sulfate concentration of the solution to about 0.75 saturation. The precipitate which hereinafter will be called "sulfate precipitate A" was collected by centrifuging and was washed with an aqueous ammonium sulfate solution of 0.75 saturation.

The filtrate and washwater were combined and ammonium sulfate was added until saturation. During this fractional precipitation step the temperature of the solution is also carefully kept at about 0° C. and should at no instant exceed 3° C. during precipitation and centrifuging. The resulting red colored "sulfate precipitate B" was dissolved in water and dialyzed against distilled water until the dialysate did not show any reaction for sulfate ions. The dialyzed solution was then subjected to vacuum freeze drying. 3.1 g. of said "sulfate precipitate B" are obtained which contain per g. 7.88 mg. of total vitamin $B_{12}$ and 7.75 mg. of bound vitamin $B_{12}$. Since the starting material, the "alcohol precipitate B," contains 3.76 mg. of vitamin $B_{12}$, it is evident that the vitamin $B_{12}$ content of the "sulfate precipitate B" is increased about 200% by such ammonium sulfate precipitation.

It may be mentioned that a saturation of 0.70 to 0.80 is apparently the most suitable degree of saturation yielding satisfactory results since "sulfate precipitates A," i.e., precipitates obtained with such a saturation contained considerably less vitamin $B_{12}$ per g. than "sulfate precipitate B," i.e., obtained with complete saturation of ammonium sulfate. It was furthermore found that the resulting red mother liquor obtained after moving "sulfate precipitate B," yielded, on dialysis and vacuum freeze drying, 3.9 g. of a powder which will be called hereinafter "sulfate mother liquor" and contains about 6.6 mg. of vitamin $B_{12}$. This indicates that part of the vitamin $B_{12}$ complex remains in solution, even in saturated ammonium sulfate solution. Both "sulfate precipitate B" as well as "sulfate mother liquor" represent highly active vitamin $B_{12}$ preparations which are very effective in the therapy of pernicious anemia.

It has been found that such highly active compounds are converted into new and heretofore unknown protein compounds which contain cobalt by subjecting such "sulfate precipitate B" and "sulfate mother liquor" to an electrophoretic process. For this purpose 2.0 g. of a mixture of said "sulfate precipitate B" and "sulfate mother liquor" obtained in the preceding ammonium sulfate fractionating process, are mixed with 2 cc. of an 0.05 M acetate buffer solution of a pH of 6.0 and with the required amount of cellulose powder of Whatman standard grade to form a paste. Said paste is filled into section 20 of the electrophoresis apparatus having altogether 30 cells of 0.5 cm. thickness each. Said apparatus will be described hereinafter in detail. A voltage of 150 volt, giving a current of about 100 milliampere, was applied to the apparatus for about 21 hours. Thereafter, the three sections which show the strongest red coloration are combined, likewise the neighboring sections of red color, each on the left and on the right side of said three sections, and also the electroendosmosis fraction on the cathode side of the apparatus. "Group A" comprises the sections at the anode which are the least colored sections. "Group B" comprises the sections which are at the anode side of the most strongly colored three sections. "Group C" comprises the three most strongly colored sections. "Group D" comprises the colored sections which are at the cathode side of "group C." "Group E" is section 20, i.e., the section originally containing the material subjected to electrophoresis, and "group F" represents the electroendosmotic sections at the cathode side of section 20. After electrophoresis, these different groups of sections are removed from the apparatus and are placed into a chromatographic tube where they are eluted with water. For each section of the apparatus there were used about 40 cc. of water. Electrophoresis was carried out at about 15° C. and elution at about 15° C. After elution, the eluates were dialyzed against distilled water containing some "Florisil" bleaching earth for a period of 94 to 144 hours, the temperature during dialysis preferably being kept at about +3° C. The dialyzed groups of sections were then subjected to vacuum freeze drying. Thereby "group C" was obtained in an amount of about 0.796 g. and proved to be a homogeneous product when tested by paper electrophoresis. This product, however, contained some insoluble matter. Therefore, 680 mg. thereof were again dissolved in water, filtered through a G5-filter, and subjected to vacuum freeze drying. 666 mg. were obtained. Subjecting said compound to a further dialysis of its aqueous solution at a pH of 5.6 of the distilled water against which dialysis was carried out, and finally to freeze drying in a vacuum, yielded about 607 mg. of a compound having the following characteristics:

The new complex is of strongly red color; its vitamin $B_{12}$ content corresponds to a ratio of 1 mol of vitamin $B_{12}$ to 1 mol of said complex compound; it contains 1 atom of cobalt per molecule; its vitamin $B_{12}$ content is about 13 μg. per mg. corresponding to the above mentioned ratio of 1 mol of vitamin $B_{12}$ to 1 molecule of the complex compound. This value corresponds also to the value found microbiologically; vitamin $B_{12}$ is present in the new complex substantially in the bound form, i.e., in the form which cannot be utilized as growth factor by *Lactobacillus leichmannii;* it is not dialyzable; its absorption spectrum shows most of the peaks of vitamin $B_{12}$ or cyanocobalamin, respectively, with slight variations. For instance, the peaks of cyanocobalamin at 410 mμ and 361 mμ are now found at 413 mμ and 363 mμ, respectively. The cyanocobalamin peak at 307 mμ is hardly visible. The very high increase in the peak at 278 mμ is due to the protein part of the molecule. Peaks at 518 mμ and 550 mμ are also present; the ratio between the optical densities at 413 mμ and 550 mμ, i.e., $D_{413}/D_{550}$ is about 0.5, between $D_{363}/D_{550}$ it is about 3.6, and between $D_{278}/D_{550}$ it is about 8.0; it is a high molecular complex compound of a molecular weight of about 100,000± 10% determined by the Svedberg method; it is soluble in water and physiological sodium chloride solution; it is substantially soluble in and substantially not precipitated from its aqueous solution at an alcohol concentratiton of about 40% and precipitates with an alcohol concentration between about 40% and about 60% at a temperature of −5° C. and at a pH of about 7.0; the complex is a mocuprotein as follows from its coloration with "Amidoschwarz 10 B" (method of Hannig and Grassmann "Hoppe-Seyler's Zeitschrift fuer physiologische Chemie," vol. 290 (1952), 1) and with periodate and fuchsine-sulfite solution (method of Koiw and Groenwall "Journal Clin. Lab. Invest.," vol. 4 (1952), 244); its mobility, measured in the electrophoresis apparatus of Tiselius (moving boundary method), was in phosphate buffer solution of pH 7.7 and ionic strength 0.1: ascending limb—3 . $10^{-5}$ cm.$^2$ . sec.$^{-1}$ . volt$^{-1}$, and descending limb—2.3 . $10^{-5}$ cm.$^2$ . sec.$^{-1}$ . volt$^{-1}$; the new compound as such is therapeutically effective as a source of vitamin $B_{12}$ on oral administration and is of high effectiveness in patients with pernicious anemia when administered with intrinsic factor preparations as they are obtained from hog's stomach, pylorus, duodenum, and the mucosa parts of said organs and others. It has the advantage over vitamin $B_{12}$ that it is not consumed by those microorganisms which normally absorb or destroy huge quantities of vitamin $B_{12}$; the new complex does not exhibit any change in its absorption spectrum by the addition of potassium cyanide at alkaline pH. Vitamin $B_{12}$ alone without the mucoprotein component completely changes its abcorption spectrum by such addition of potassium cyanide. Likewise, potassium cyanide addition does not render the new complex microbiologically available; the new complex compound is the first well defined cobalt containing protein ever produced. It will be called herein and in the claims annexed hereto "cobalamin protein."

The electrophoresis apparatus used in these experiments consists in an elongated box which is open at both sides and at the top. Said box is subdivided into 10, 15, 20, 30, or even more sections, by paper strips which are of the same form and dimensions as the inside of the box. The sides of the box are closed by K-filters which also fit the box. The sections between said paper strips are filled with cellulose powder which serves as supporting medium for the solution to be subjected to electrophoresis. The size of the apparatus may vary. Good results were obtained with a small apparatus of 15 x 5 x 5 cm. or with a larger apparatus of 15 x 5 x 15 cm. The apparatus is, however, not limited to said sizes. The thickness of each sector or cell is preferably between 0.5 cm. and 1.0 cm. That part of the apparatus where the compound to be subjected to electrophoresis is introduced into the apparatus, is provided not only with paper strips at both sides, but also with aluminum foils of the same size. Usually the cell nearest to ⅓ of the length of the apparatus towards the cathode is used as supply section. It is, however, possible to introduce the compound to be subjected to electrophoresis at any place of the apparatus if only one special fraction of the various fractions is desired or required.

To supply said compound to the apparatus, the section of cellulose powder between the aluminum foils is removed from the apparatus. The two aluminum foils are also taken out. The compound to be tested is mixed, as described above with the removed cellulose powder and with sufficient amounts of the desired buffer solution to form a paste. Said paste is then introduced into the apparatus at the place where the aluminum foils and cellulose powder were removed and said hole in the sections is completely filled up with said cellulose paste. The cellulose powder in the other sections was saturated, before filling it into the apparatus, with the desired buffer solution. Thereafter the box is placed into those parts of the apparatus which supply and conduct the current, i.e., into buffer compartments, electrodes, and plastic sponges which serve as connection between buffer compartments and the box with said cellulose cells or sections. Electric current is then passed through the whole apparatus for the required period of time. The voltage measured between the buffer solutions in the buffer compartments is preferably about 100 to 150 volts giving a current of about 100 milliamperes. Electrophoresis is carried out for 16 to 48 hours or longer, if necessary. Thereafter the various sections of cellulose powder into which the substances have migrated under the influence of the electric current in accordance with their mobility, are separated and the various compounds and fractions are eluted therefrom. As described above, it is, of course, possible to combine several sections and to elute such combined sections jointly. Since the thickness of the sections may be varied, it is possible to divide a given concentrate into as many fractions as desired.

A pharmaceutical preparation suitable for treating pernicious anemia is prepared by mixing into the form of a tablet 0.37 mg. of the new cobalamin protein with about 1 g. of hog pylorus or stomach, or duodenum mucosa or the corresponding amount of aqueous extracts, dry powders and the like purified preparations prepared from such mucosa. The amount of mucosa preparation may even be increased in excess of 1 g. the excess being generally unharmful to the patient. Such a tablet contains 0.375 mg. of the cobalamin protein and represents approximately a daily dose.

Instead of adding vitamin $B_{12}$ directly to a solution prepared, for instance, from hog stomach, pylorus, duodenum, the mucosa of said organs, and aqueous extracts thereof, it is also possible to use as starting material for producing the new cobalamin protein the preparations obtained in Examples 1 to 5, dissolve the same in physiological salt solution, add to the solution vitamin $B_{12}$ in an amount slightly in excess to the amount corresponding to the units of binding constituents and then work up the mixture as described in Example 9 by alcohol fractionation, ammonium sulfate precipitation, and electrophoresis. It is also possible to first precipitate the above mentioned physiological salt solution with alcohol of a concentration between about 40% and about 60% and then to add vitamin $B_{12}$ to an aqueous solution of said "alcohol fraction B," or to first precipitate said solution in physiological salt solution with alcohol and subsequently with ammonium sulfate and then add vitamin $B_{12}$ to an aqueous solution of said "sulfate precipitate B" and/or "sulfate mother liquor" and then work up the resulting vitamin $B^{12}$ containing solutions by means of ammonium sulfate precipitation and electrophoresis or by means of electrophoresis, respectively. The intermediate fractions before the addition of vitamin $B_{12}$ represent highly effectively products with a high binding power for vitamin $B_{12}$ and also a high intrinsic factor activity.

Instead of dissolving the starting material used in Example 9, in physiological sodium chloride solution, it may also be dissolved in water and then subjected to fractional precipitation by means of alcohol. The products obtained by fractionating such aqueous solution have about the same properties as those obtained from solutions in physiological salt solution and yield when converted, with added vitamin $B_{12}$, into preparations for pernicious anemia therapy, such as tablets, pills, and the like, highly effective preparations.

In place of the electrophoresis apparatus described in Example 9, other apparatus for carrying out such electrophoretic processes may be used provided they permit separation of a sufficient number of fractions or render possible collection of at least that fraction of the starting material which yields the new cobalamin protein.

In the electrophoresis process as described above an acetate buffer solution is used. One may, however, employ other buffer solutions, such as phosphate, barbiturate or the like buffer solution, such as solutions of a pH between about 3.0 and about 9.0, and preferably of a pH between 6.0 and 8.5.

It may also be mentioned that, when using a high speed centrifuge for separating "sulfate precipitate B" from the mother liquor instead of a low speed centrifuge as given in the above mentioned Example 9, most of the active products appear in the precipitate whereas the mother liquor retains only minor amounts thereof and, therefore, may be discarded.

We claim:

1. In a process of preparing a physiologically active preparation containing vitamin $B_{12}$, the steps comprising mixing an aqueous solution of vitamin $B_{12}$ in an aqueous extract derived from animal pylorus, stomach, and duodenum, and the mucosa of said organs, said extract containing a factor having, in the free state, binding power for vitamin $B_{12}$ and having intrinsic factor activity, with an organic, water miscible liquid selected from the group consisting of a lower alkanol and a lower alkanone, said organic liquid being added in an amount sufficient to cause substantially complete precipitating of said factor, the temperature during and after addition of said organic liquid being maintained at a temperature not substantially exceeding 0° C., separating resulting precipitate from said liquid, dissolving said precipitate in an aqueous medium, removing undissolved matter from the resulting solution, adding ethanol to said solution in an amount sufficient to yield an alcoholic solution of about 40% alcohol concentration, removing the resulting precipitate, adding further amounts of ethanol to the solution in an amount sufficient to increase the alcohol concentration to about 60%, and collecting the resulting precipitate, said precipitate being an orally highly effective vitamin $B_{12}$ preparation, the temperature during said alcohol precipitation steps and during working up the reaction mixture being maintained at a temperature substantially not exceeding 0° C.

2. In a process of preparing a physiologically active preparation containing vitamin $B_{12}$, according to claim 1, wherein the alcohol concentration of the first alcohol precipitation step is 43.7% and the alcohol concentration of the second alcohol precipitation step is 56%.

3. In the process according to claim 1, wherein the resulting precipitate, for further purification, is dissolved in water, any insoluble matter present in the resulting solution is removed, ammonium sulfate is added to said solution in an amount sufficient to cause about 0.8 saturation of the solution with ammonium sulfate, the resulting precipitate is removed, further amounts of ammonium sulfate are added to said solution to cause complete saturation thereof with ammonium sulfate, the resulting precipitate is separated from the saturated ammonium sulfate solution, dissolved in water, dialyzed against distilled water, and the remaining dialyzed solution of said precipitate is evaporated to dryness, the temperature during said process steps continuously being kept at a temperature not substantially exceeding 0° C.

4. In the process according to claim 3, wherein the saturated ammonium sulfate mother liquor, after separating the precipitate therefrom, is dialyzed against distilled water, and the dialyzed mother liquor is evaporated to dryness, the temperature during said steps continuously being kept at a temperature not substantially exceeding 0° C.

5. In the process according to claim 3, wherein the precipitate obtained on saturation with ammonium sulfate solution is dissolved in water and subjected to an electrophoretic treatment at a pH between about 6.0 and about 8.0 at a voltage between about 100 volt and about 150 volt and a current of about 100 milliampere, the most deeply red colored fractions obtained on said electrophoresis are collected, an aqueous solution of said most deeply red colored fractions are dialyzed against distilled water, and said dialyzed solution is evaporated to dryness, the temperature during said electrophoresis, dialyzing, and drying steps being carried out at a temperature not substantially exceeding room temperature.

6. In a process of producing a biologically active compound having vitamin $B_{12}$ activity, the steps comprising mixing an aqueous solution of an extract of a digestive organ having binding power for vitamin $B_{12}$ and intrinsic factor activity, and vitamin $B_{12}$ with an organic liquid selected from the group consisting of a lower alkanol and a lower alkanone, at a tempearture not substantially exceeding 0° C. and separating the resulting precipitate from the liquid.

7. In the process of manufacturing a biologically active preparation according to claim 6 wherein the digestive organ is a digestive organ selected from the group consisting of hog's stomach, pylorus and duodenum and mucosa of said organs, and extracts of said organs and said mucosa.

8. In the process of producing a biologically active compound having vitamin $B_{12}$ activity, the steps comprising mixing an aqueous solution of an extract of a digestive organ having binding power for vitamin $B_{12}$ and intrinsic factor activity and vitamin $B_{12}$ with at least three times its volume of an organic liquid selected from the group consisting of a lower alkanol and a lower alkanone, at a temperature not substantially exceeding 0° C. and separating the resulting precipitate from the liquid.

References Cited in the file of this patent

UNITED STATES PATENTS 2,582,589    Fricke _____ Jan. 15, 1952

OTHER REFERENCES

Holdsworth: Nature, vol. 171, Jan. 24, 1953, pp. 148–150.

Spies: So. Med. Jour., vol. 43, March 1950, pp. 206–208.

Ternberg: J. of the Am. Chem. Soc., vol. 71, November 1949, p. 3858.

Glass: Science, vol. 115, Feb. 1, 1952, pp. 101–108.

Bird: J. of Biol. Chem., vol. 190, May 1951, pp. 181–189.

Roland: J. of Biol. Chem., vol. 202, June 1953, pp. 857–863.